United States Patent
Hobbs

(10) Patent No.: US 9,457,727 B2
(45) Date of Patent: Oct. 4, 2016

(54) TILTABLE RACK SYSTEM

(76) Inventor: Milton C. Hobbs, Hephzibah, GA (US)

( * ) Notice: Subject to any disclaimer, the term of this patent is extended or adjusted under 35 U.S.C. 154(b) by 763 days.

(21) Appl. No.: 13/610,841

(22) Filed: Sep. 11, 2012

(65) Prior Publication Data

US 2013/0062378 A1    Mar. 14, 2013

Related U.S. Application Data

(60) Provisional application No. 61/533,558, filed on Sep. 12, 2011.

(51) Int. Cl.
*B60R 9/042* (2006.01)
*B60R 9/06* (2006.01)

(52) U.S. Cl.
CPC ........ *B60R 9/042* (2013.01); *B60R 9/06* (2013.01)

(58) Field of Classification Search
CPC ........ B60R 9/042; B60R 9/0423; B60R 9/06
USPC ........................................ 224/403, 405, 310
See application file for complete search history.

(56) References Cited

U.S. PATENT DOCUMENTS

| | | | |
|---|---|---|---|
| 3,830,389 A | 8/1974 | Van Acker | |
| 4,003,485 A | 1/1977 | Edgerton | |
| 4,239,438 A * | 12/1980 | Everson | 414/462 |
| 5,297,912 A | 3/1994 | Levi | |
| 5,417,358 A | 5/1995 | Haselgrove | |
| 5,535,929 A | 7/1996 | Neill | |
| 5,544,796 A | 8/1996 | Dubach | |
| 5,806,905 A | 9/1998 | Moore | |
| 5,884,824 A | 3/1999 | Spring, Jr. | |
| 6,015,074 A | 1/2000 | Snavely et al. | |
| 6,105,840 A | 8/2000 | Trevino et al. | |
| 6,158,638 A | 12/2000 | Szigeti | |
| 6,360,930 B1 | 3/2002 | Flickenger | |
| 6,428,263 B1 | 8/2002 | Schellens | |
| 6,520,393 B1 | 2/2003 | Ferguson | |
| 6,679,407 B2 | 1/2004 | Weeks | |
| 6,681,970 B2 | 1/2004 | Byrnes | |
| 7,108,162 B2 | 9/2006 | Stadler et al. | |
| 7,128,355 B1 * | 10/2006 | Anderson et al. | 296/3 |
| 7,137,479 B2 | 11/2006 | Ziaylek et al. | |
| 7,513,548 B1 | 4/2009 | Win | |
| 7,513,730 B2 | 4/2009 | Goyanko | |
| 7,581,917 B1 | 9/2009 | Depagter | |
| 7,780,050 B2 * | 8/2010 | Tucker | 224/310 |
| 7,845,528 B2 | 12/2010 | McMillan | |
| 8,113,562 B2 | 2/2012 | Skoglun | |
| 2004/0028511 A1 | 2/2004 | Eaton | |
| 2006/0065685 A1 | 3/2006 | Fitzsimmons | |
| 2006/0196904 A1 * | 9/2006 | Tucker | 224/310 |
| 2007/0090139 A1 | 4/2007 | McKenzie | |
| 2009/0140021 A1 | 6/2009 | Richter et al. | |
| 2009/0145940 A1 * | 6/2009 | Bukowiec | 224/310 |
| 2014/0030054 A1 * | 1/2014 | Levi | 414/809 |

* cited by examiner

*Primary Examiner* — Corey Skurdal
(74) *Attorney, Agent, or Firm* — Dinsmore & Shohl LLP

(57) ABSTRACT

A rack assembly that is used to load and unload heavy or bulky material on an overhead rack of a truck, van, trailer, or similar vehicle. The rack assembly may include a base assembly, which may be sized to fit a range of vehicles, trailers, and the like. The rack assembly includes a movable part which rolls down over the side of the vehicle and allows improved access to simplify the loading and unloading operations used to secure any material to the rack. The movable part may include a manual handle, or a power assist mechanism, to assist in loading and unloading operations.

15 Claims, 4 Drawing Sheets

TILTABLE RACK SYSTEM

CROSS-REFERENCE TO RELATED APPLICATIONS

This application claims the benefit of priority to U.S. Provisional Patent Application No. 61/533,558 filed on Sep. 12, 2012 by the present inventor, the contents of which are incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to a tilting rack system for a vehicle, which is especially suited for use with a pick-up truck, and more specifically a tilting rack system that rack rolls down over the side of the vehicle and allows easy access to simplify the loading, unloading, and any tie-down operations of any material that would normally be placed on the overhead rack of a truck, van or similar vehicle.

2. Background of the Invention

Several prior truck rack systems include overhead actuation features that ease the loading and unloading of long or bulky items over the top of the truck's bed, and then over the cab of the truck. Many of these truck racks require an extensive retrofit to install, and its mechanism of operation is very complex. An improved rack is needed that rolls down over the side of the vehicle and allows easy access to simplify the loading and unloading of any material that would normally be placed on the overhead rack of a vehicle.

SUMMARY OF THE INVENTION

This invention pertains to a rack assembly that is used to load and unload heavy or bulky material on an overhead rack of a truck, van, trailer, or similar vehicle. The rack assembly may include a base assembly, which may be sized to fit a range of vehicles, trailers, and the like. The rack assembly includes a movable part which rolls down over the side of the vehicle and allows improved access to simplify the loading, unloading, and/or tie-down operations used to secure any material to the rack. The movable part may include a manual handle, or a power assist mechanism, to assist in loading and unloading operations.

BRIEF DESCRIPTION OF THE DRAWINGS

Referring now to the drawings in which like reference numbers represent corresponding parts throughout.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention generally provides a rack assembly that is used to load and/or unload heavy or bulky material (e.g., lumber, garage doors, building materials, etc.) on an overhead rack (or similar locations) of a truck, van, trailer, or similar vehicle. The rack assembly may roll down over the side of the vehicle and allows improved access to simplify the loading, unloading, and/or tie-down operations used to secure any material to the rack.

Figure 1:
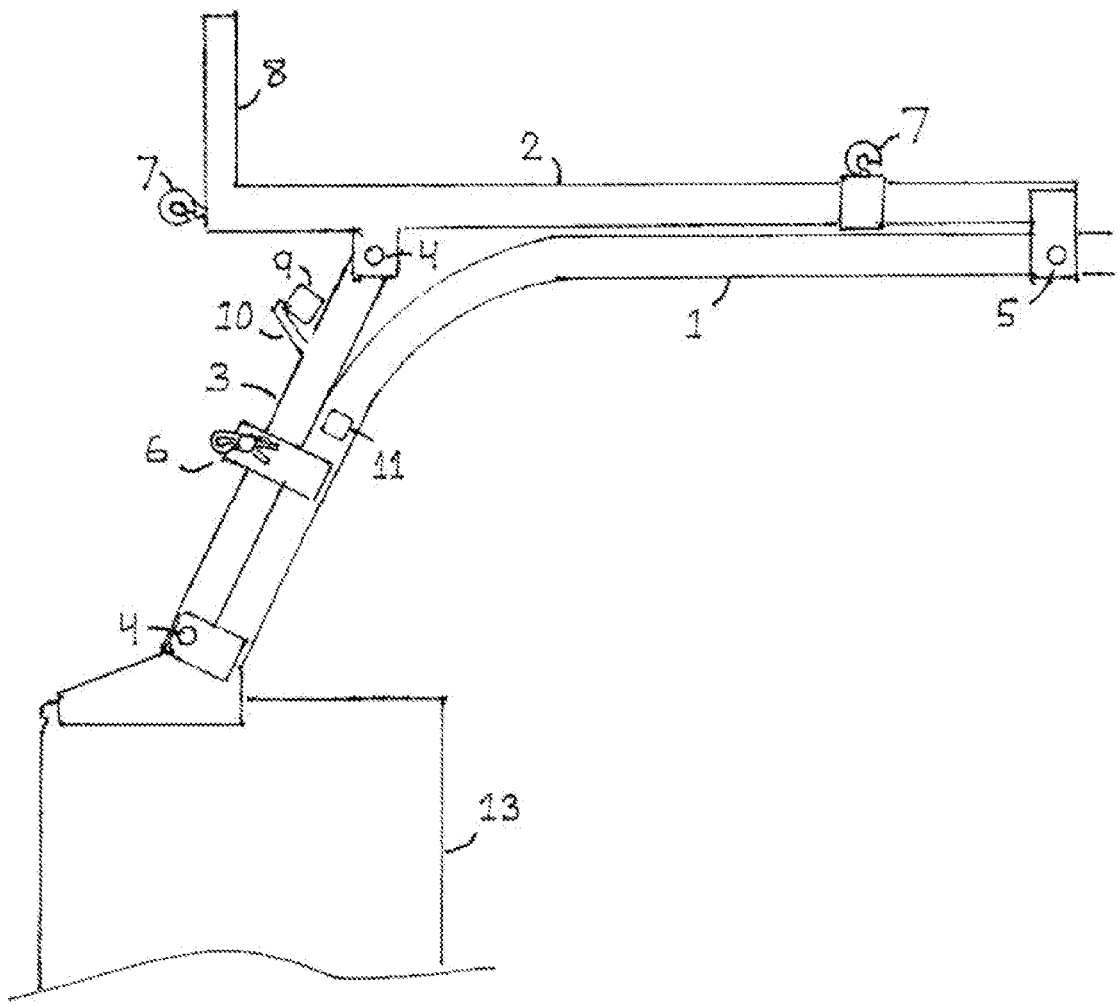
FIG. 1 illustrates an end view of one side of a rack assembly according to an exemplary embodiment the invention.
Figure 2:
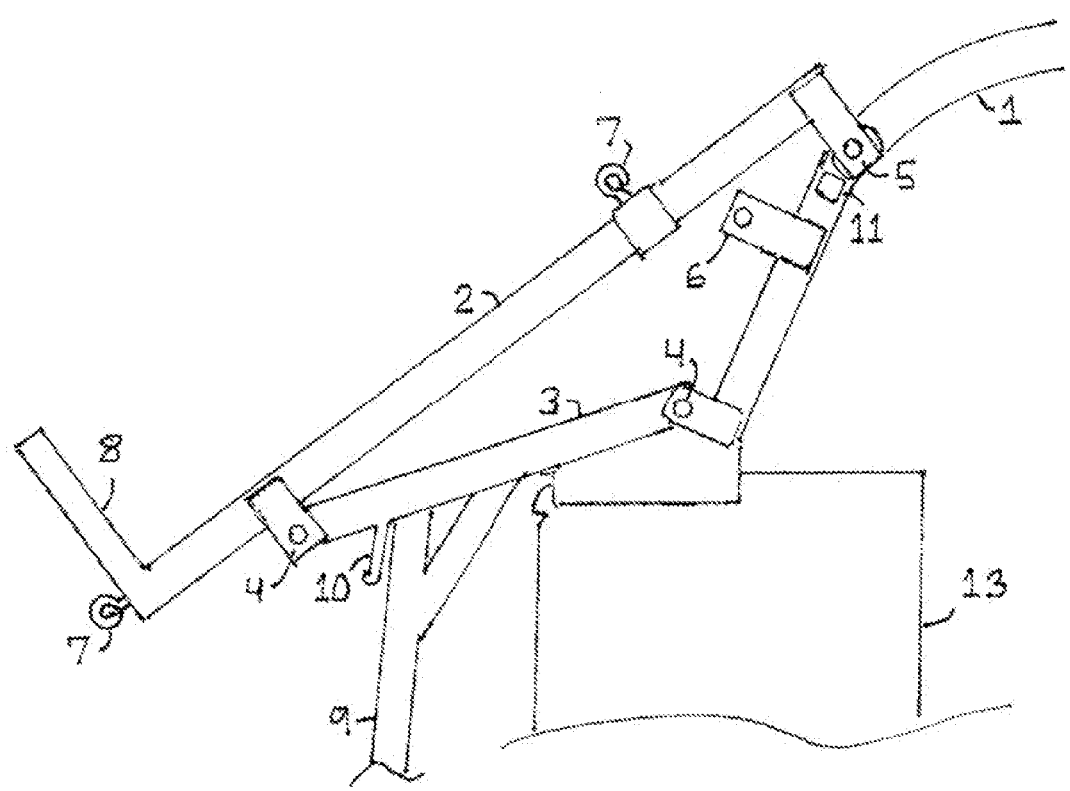
FIG. 2 illustrates an end view of the rack assembly of FIG. 1 with a movable part of the rack in a lowered (open) position.
Figure 3:
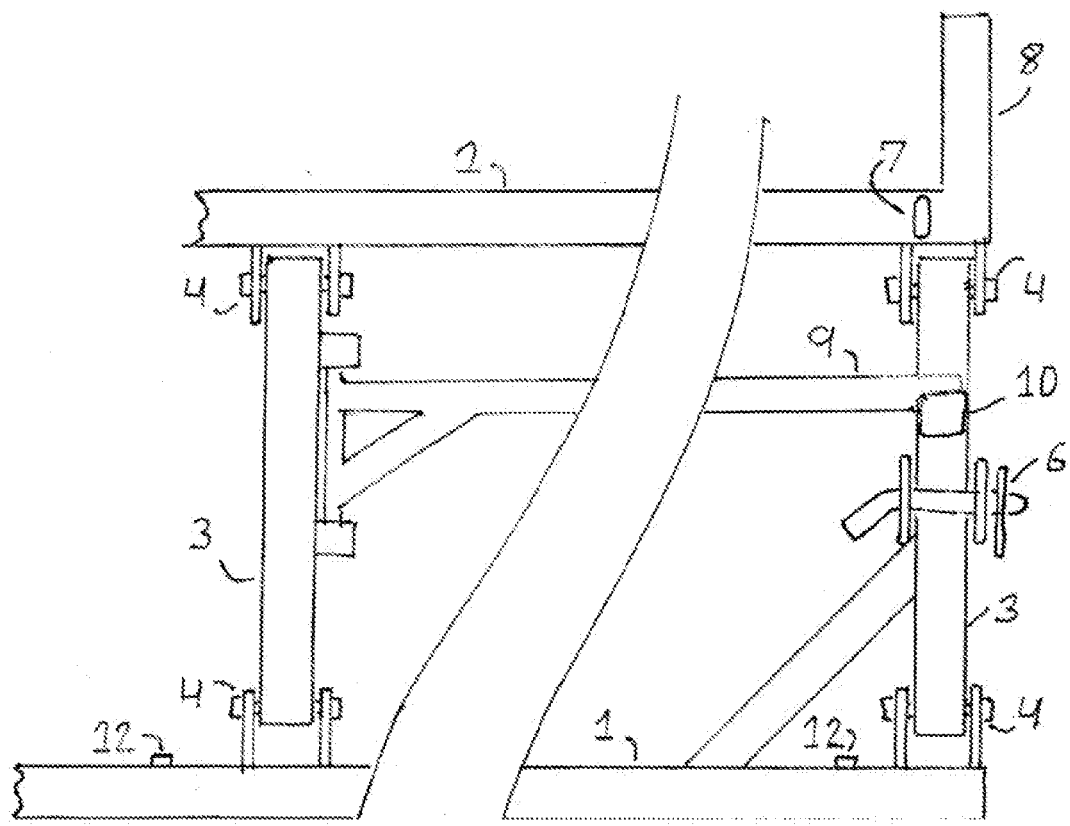
FIG. 3 illustrates a side view of the rack assembly of FIG. 1.
Figure 4:
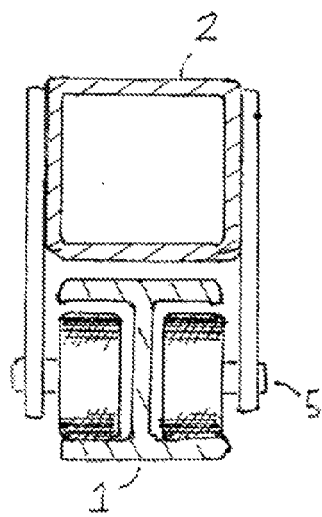
FIG. 4 illustrates rollers that may be included in the movable part of the rack assembly of FIG. 1
Figure 5:
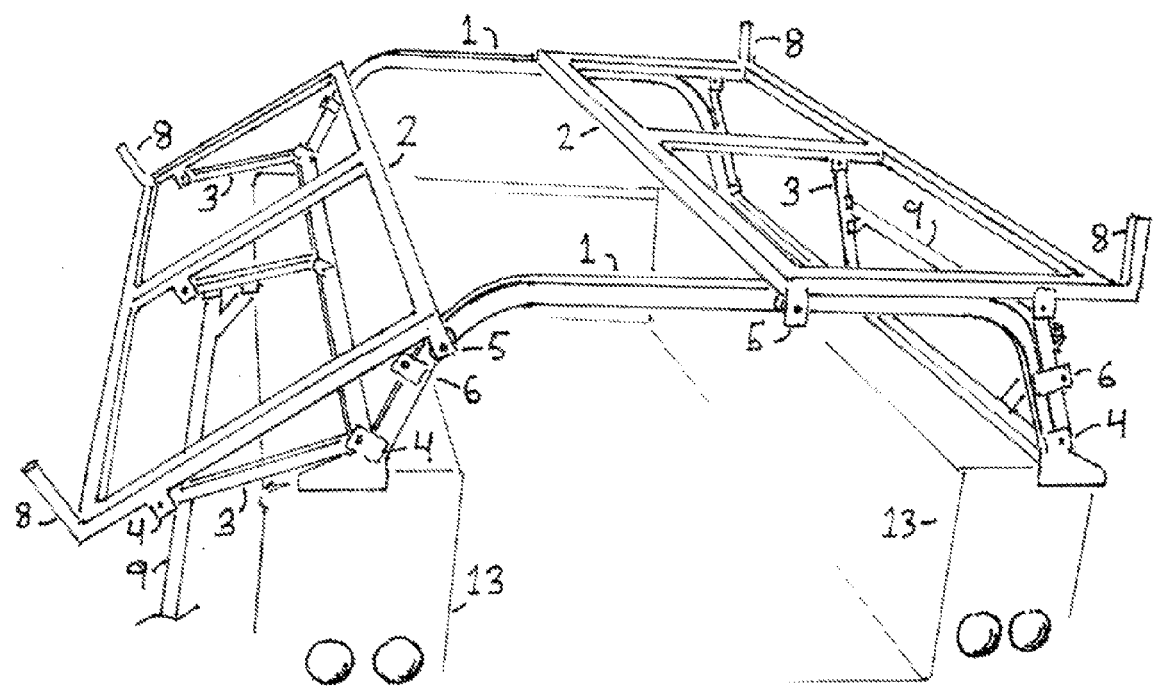
FIG. 5 illustrates a perspective view of the rack assembly of FIG. 1 with one movable part (right side) in a raised (closed) position and another movable part (left side) in a lowered position (open position).

As shown in FIGS. 1-6, the rack assembly may include a base assembly 1, which may be sized as needed to fit a range of vehicles, trailers, etc. The base assembly 1 is the stationary part of the rack system and includes a tracking system as shown in FIG. 4 on which the movable part 2 of the rack may ride. The base assembly 1 may be mounted on different vehicles in different ways. The base assembly 1 may include a pair of horizontal rails, for instance, mounted on each side of a truck bed 13. Alternatively, the base assembly 1 may include a vertical member at each of four corners corresponding to a rectangular rack. The rails or vertical corner members may be connected by vertical, angled, or radiused members at each corner.

The base assembly 1 may be secured to the vehicle body at anchor points 12. The movable part 2 may include vertical load supports 8 which may be used to maintain cargo position during the loading process and also to maintain cargo positioning when the vehicle is under way.

The movable part 2 of the rack may have the general appearance of a ladder and may include side members and connecting cross members as needed to adequately support expected loads. The movable part 2 of the rack may include rollers 5 or bearings to assist with the lowering and raising operation of the rack. The outboard edge of the movable part 2 of the rack may include hinges 4, rollers and/or bearings 5 as well as connecting arms 3 that may guide the movable part 2 of the rack as it is lowered off the side of the vehicle or trailer.

Figure 6:
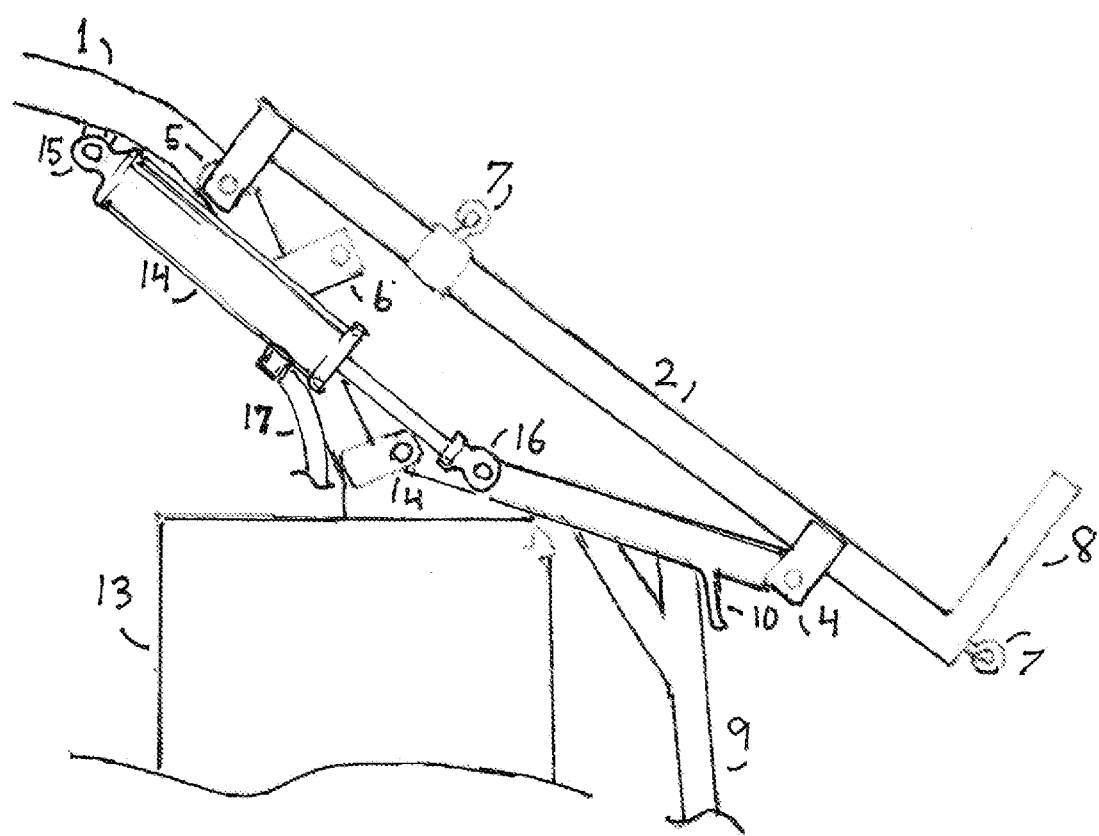
FIG.6 illustrates a perspective view of the rack assembly of FIG. 1 with a power assist mechanism.

A manual handle 9, or a powered assist mechanism 14, which may include electric motors, hydraulics and/ or air power, as well as gearing and cables, may be attached to assist during loading and unloading operations. As shown in FIG. 6, the powered assist mechanism 14 is connected between the rack assembly 1 and the connecting arms 3 via a cap-end eye 15 on one end and a rod eye 16 on the opposite end. A tube or conduit 17 is attached to the powered assist mechanism 14 for power from electric, hydraulic, or pneumatic devices. A support dock 10 is provided to store the manual handle when not in use. Safety mechanisms, which may include automatic or manual locks, pins and/or clasping mechanisms 6, may secure the movable part 2 of the rack in the loaded or closed position. A stop-block 11 may be provided to arrest the downward motion of the movable part 2 at the desired location.

Various tie-downs 7 may be included at appropriate locations on the rack (such as various places along the movable part 2 of the rack) and may be used to secure various loads to the rack.

The rack may be made of various appropriate materials and/or combinations of materials (e.g., steel, stainless steel, aluminum, fiberglass, etc.). Powder coating or a baked on finish may be applied in some cases, and any aluminum may be anodized.

The rack may be assembled using bolts, pins, hinges 4, and/or other appropriate ways (e.g., welding various components together, forming various elements of the rack using an injection molding process, etc.). The rack may include ports and/or fittings for admitting lubricant to any joints. The handle 9 or power assist mechanism may connect to the connecting arm 3 or elsewhere on the movable part 2 of the rack, which in turn will ride on the base assembly 1 of the rack. The racks may be manufactured in a machine shop, an assembly/production line, and/or other appropriate ways.

The base assembly 1 may be attached to the bed or top of a vehicle or trailer. The movable part 2 of the rack may ride on and be guided by the tracking elements of the base part of the rack, including any connecting arms 3 or hinges 4 at the outboard edges of the rack. Any manual handle or power assist mechanism may control the movable part of the rack, allowing the movable part 2 to move out and down at an angle when the rack is lowered for loading or unloading. The opposite movement may be used to return the rack to a closed position. The rollers 5, bearings or slides may be mounted on the base part of the rack and the tracking part of the rack may be located on the movable part of the rack.

In operation, the user unlatches the clasping mechanisms 6. The user pulls the movable part 2 away from the vehicle. Alternately, the user may use the manual hand assembly 9. The manual hand assembly 9 is pulled away from the support dock 10. The manual hand assembly is pulled away from the vehicle and the movable part 2 rolls along the base assembly 1 until the rack is in the open position for loading. Materials are loaded onto the movable part 2 and the vertical load supports 8 keep large materials from rolling off movable part 2. The loaded materials may be tied-down at the anchor points 7.

After loading, the user pushes the movable part 2 towards the vehicle. Alternately, the user may use the manual hand assembly 9. The manual hand assembly 9 is pushed towards the vehicle and the movable part 2 rolls along the base assembly 1 until the rack is in the closed position for traveling. The manual hand assembly 9 is pushed to rest on the support dock 10. The user latches the clasping mechanisms 6.

Although the rack and its various components have been described with reference to various details, one of ordinary skill in the art will recognize that the rack and/or its components may be used in different ways without departing from the spirit of the invention. For instance, although the rack may have been described as mounting on a particular type of vehicle, the rack could be mounted on various other objects (e.g., trailer, farm equipment, etc.) in various appropriate ways. In addition, the rack may be used in an industrial setting (or other appropriate setting) where access to stored materials may be enhanced (e.g., when storing large or bulky items on a shelf, when loading or unloading items to or from a relatively high position, etc.). Furthermore, in addition to being used to load heavy or bulky items, the rack may be used to load relatively light items (e.g., ladders, kayaks, etc.).

It should be understood, of course, that the foregoing relates to exemplary embodiments of the invention and that modifications may be made without departing from the spirit and scope of the invention as set forth in the following claims.

I claim:

1. A tilting rack system adapted for mounting on a vehicle or trailer, the rack system comprising:
    a base assembly including two parallel, spaced-apart track members, each track member having a horizontal center portion and two side portions that slope downwardly and away from the horizontal center portion, each side portion terminating in an end portion coupled to a vehicle or trailer through a mounting element;
    a generally rectangular rack with front and back members defining a width, and two side members defining a depth, and wherein the front, back and side members are interconnected through two front corners and two back corners;
    wherein the back corners of the rack are coupled to the track members through rollers or bearings enabling the rack to be moved back and forth between a stowed position, wherein the rack is horizontally disposed on the center portions of the base assembly, and a loading position, wherein the rack is pulled out and down at an angle relative to a side of the vehicle or trailer; and
    at least two connecting arms to guide the rack as it is moved back and forth between the stowed and loading positions, each connecting arm having a first end hinged to a respective one of the mounting elements and a second end hinged to a respective one of the side members of the rack.

2. The rack system of claim 1, wherein the width of the rack corresponds to the spacing between the two parallel, spaced-apart track members.

3. The rack system of claim 1, wherein the back corners of the rack remain at a fixed distance from the track members as the rack is moved between the stowed and loading positions.

4. The rack system of claim 1, further including a plurality of load supports extending vertically upwardly from the front member of the rack.

5. The rack system of claim 1 wherein, in the stowed position, the connecting arms are disposed against the two side portions of the base assembly.

6. The rack system of claim 1, further including a manually operated handle coupled to the rack to assist with moving the rack between the stowed and loading positions.

7. The rack system of claim 6, wherein the manually operated handle is hinged to the rack, the assembly further including a support dock for storing the handle when not in use.

8. The rack system of claim 1, further including a powered assist mechanism coupled to the rack to assist with moving the rack between the stowed and loading positions.

9. The rack system of claim 8, wherein the powered assist mechanism includes an electric motor.

10. The rack system of claim 8, wherein the powered assist mechanism is hydraulic.

11. The rack system of claim 8, wherein the powered assist mechanism is pneumatic.

12. The rack system of claim 8, wherein the powered assist mechanism includes gearing and cables.

13. The rack system of claim 1, further including a safety mechanism to secure the rack in the stowed or loading positions.

14. The rack system of claim 1, further including a stop block to limit the movement of the rack as it is moved from the stowed to the loading position.

15. The rack system of claim 1, including two racks configured as mirror images coupled to the same track members, such that one of the racks is pulled out and down relative to one side of a vehicle or trailer, and the other rack is pulled out and down relative to an opposing side of the vehicle or trailer.

* * * * *